United States Patent
Hans (10) Patent No.: US 12,452,936 B2
(45) Date of Patent: Oct. 21, 2025

(54) NON-3GPP HANDOVER PREPARATION

(71) Applicant: IPCOM GMBH & CO. KG, Pullach (DE)

(72) Inventor: Martin Hans, Bad Salzdetfurth (DE)

(73) Assignee: IPCom GmbH & Co. KG, Pullach (DE)

( * ) Notice: Subject to any disclaimer, the term of this patent is extended or adjusted under 35 U.S.C. 154(b) by 293 days.

(21) Appl. No.: 17/907,273

(22) PCT Filed: May 3, 2021

(86) PCT No.: PCT/EP2021/061567
§ 371 (c)(1),
(2) Date: Sep. 26, 2022

(87) PCT Pub. No.: WO2021/224183
PCT Pub. Date: Nov. 11, 2021

(65) Prior Publication Data
US 2023/0111913 A1    Apr. 13, 2023

(30) Foreign Application Priority Data
May 8, 2020   (EP) .................................. 20173669

(51) Int. Cl.
| | |
|---|---|
| *H04W 4/00* | (2018.01) |
| *H04W 36/00* | (2009.01) |
| *H04W 36/14* | (2009.01) |
| *H04W 36/18* | (2009.01) |
| *H04W 76/12* | (2018.01) |

(52) U.S. Cl.
CPC ...... *H04W 76/12* (2018.02); *H04W 36/00226* (2023.05); *H04W 36/142* (2023.05); *H04W 36/18* (2013.01)

(58) Field of Classification Search
None
See application file for complete search history.

(56) References Cited

U.S. PATENT DOCUMENTS

2024/0172179 A1* 5/2024 Ryu ...................... H04W 68/02

OTHER PUBLICATIONS

"3rd Generation Partnership Project; Technical Specification Group Services and System Aspects; Procedures for the 5G System (5GS); Stage 2 (Release 16)", vol. SA WG2, No. V16.4.0, Mar. 27, 2020 (Mar. 27, 2020), p. 1-582, 3GPP Standard; Technical Specification; 3GPP TS 23.502, 3rd Generation Partnership Project (3GPP), Mobile Competence Centre ; 650, Route Des Lucioles ; F-06921 ; F-06921 Sophia-Antipolis Cedex ; France.

(Continued)

*Primary Examiner* — Zewdu A Beyen
(74) *Attorney, Agent, or Firm* — Proi Intellectual Property US (57) ABSTRACT

The present invention provides a method for a user equipment, UE, device to hand over a connection to a first data network from a first access network of a first mobile communications network to a second access network of a second mobile communications network, in which a communication tunnel is established in the first communications network to a non-3GPP interworking function and after the handover to the second mobile communications network, the second network establishes a connection to that N3IWF.

20 Claims, 7 Drawing Sheets

(56) References Cited

OTHER PUBLICATIONS

Huawei, HiSilicon, Solution for seamless service continuity between the PLMN and NPN for single radio UE-N3IWF [online], 3GPP TSG SA WG2 #129BIS S2-1812243.
3 GPP TS 23.502 V16.4.0 (Mar. 2020) 3rd Generation Partnership Project; Technical Specification Group Services and System Aspects; Procedures for the 5G System (5 gs); Stage 2 (Release 16).

* cited by examiner

NON-3GPP HANDOVER PREPARATION

The present invention relates to a handing over of a connection to a network between one access network and another.

Current cellular mobile communication systems offer connections for user equipment (UE) devices to a public land mobile network (PLMN) via a variety of access networks (AN). Radio access networks (RAN) are usually part of the PLMN, deployed and maintained by the operator of the PLMN and therefore trusted. Examples of access technologies of RANs are UMTS (3G), LTE (4G) and new radio (NR, 5G). In addition, PLMNs offer access via external networks, that are not part of the PLMN and whose access technology is not specified by 3GPP. The access type is then called "non-3GPP access". In the usual case in which there is no trust relationship between a PLMN and the non-3GPP AN, the access is also called "untrusted non-3GPP access". Typical examples for such non-3GPP access technologies are Wi-Fi (WLAN) or fixed broadband access.

Figure 1:
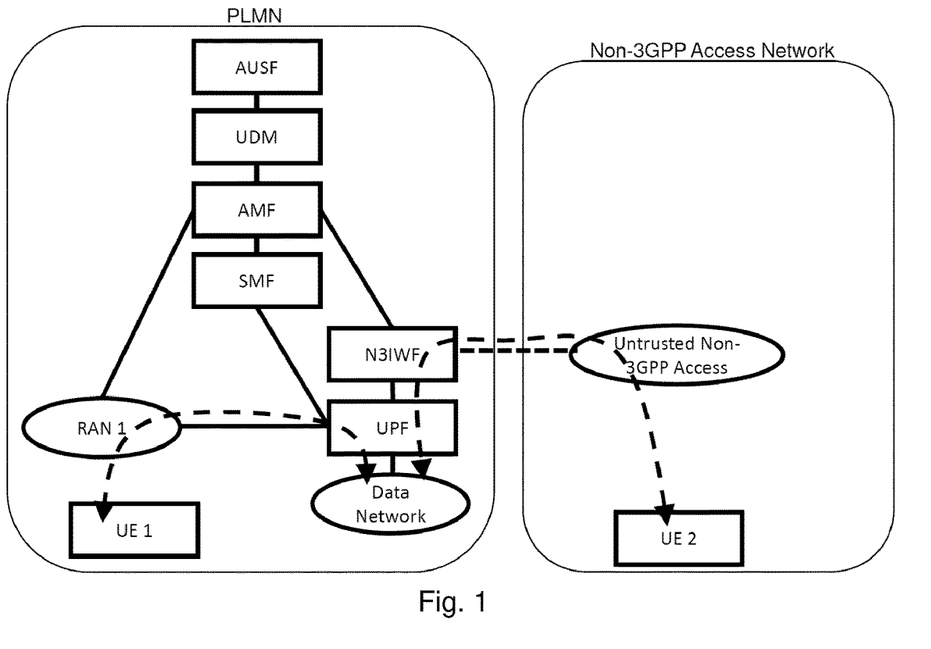
FIG. 1 shows a schematic illustration of data flows with and between a PLMN and a non-3GPP access network.

The 5G architecture for non-3GPP access is depicted in FIG. 1. A PLMN is shown with its most important core network entities. These are the authentication and security function (AUSF), the universal data management function (UDM), comprising e.g. the subscriber database, and the authentication and mobility function (AMF). The main functions of these entities are the registration of UE devices in the core network including authentication, authorization and enabling UE device mobility throughout the network. Further, the PLMN has user plane functions (UPFs) for each connection of a UE device to a data network and session management functions (SMFs) managing user data connections of devices through the core network, including the data routing and quality of service (QoS) aspects. Such a data connection is called a PDU session in the 5G architecture defined by 3GPP. In an exemplary manner, a single UE device (UE 1) is depicted in FIG. 1 connected to the PLMN via a RAN (RAN 1). A dashed line shows a single user plane connection, PDU session, between the UE device and a data network, e.g. the internet, via a UPF.

An untrusted non-3GPP access network is connected via a non-3GPP interworking function (N3IWF) with the PLMN. The path of the user data between a UE device (UE 2) connected to the non-3GPP AN, e.g. a public WLAN hotspot, and via the non-3GPP AN to a data network of the PLMN via the N3IWF and a UPF is also depicted in FIG. 1. The UE device is controlled by an AMF in the PLMN while the non-3GPP access network is not controlled by the PLMN. FIG. 1 is simplified in various aspects, e.g. the UPFs, SMFs and AMFs serving UE 1 and UE 2 are likely to be different entities of which only one is shown in the figure. As one PLMN offers connections to a variety of different data networks, the PDU sessions may connect to different data networks. Also, UE 1 and UE 2 may well be the same UE device, i.e. a single device that has a cellular transceiver for connecting to a RAN and a non-cellular transceiver, e.g. a WLAN module, to access to a public hot spot. In that case, the UE device would be served by a single AMF but still different SMFs and UPFs may manage and constitute the user data connections. The described non-3GPP access architecture was originally introduced to connect a UE device to a PLMN in parallel to an existing RAN connection to the same PLMN or to a PLMN only via non-3GPP access, e.g. if a RAN to the PLMN is not accessible.

Figure 2:
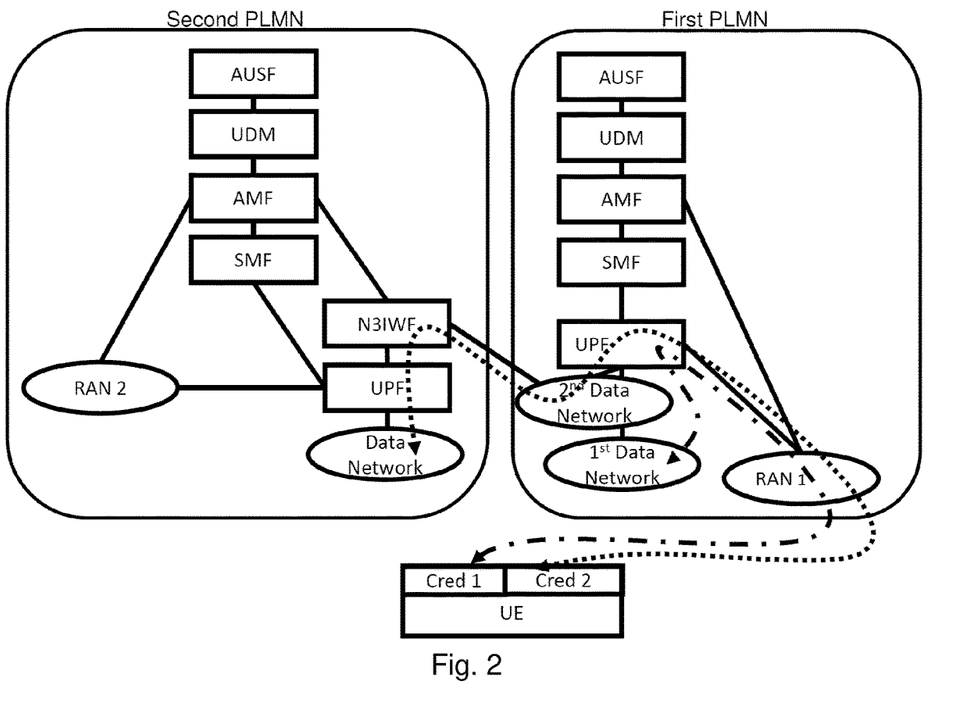
FIG. 2 shows a UE connecting to a second PLMN via a first PLMN and, using a N3IWF of the second PLMN, to a data network.

The non-3GPP access architecture as described above is reused in enhanced 5G networks for cases where a UE device with a single cellular transmitter or a single cellular transceiver is registered in two different networks in parallel. The UE device is then connected to a first network via a RAN of the first network and in parallel to a second network via the first network and the N3IWF of the second network. This architecture is depicted in an exemplary manner in FIG. 2. The figure shows a first network and a UE device connected to the first network via a RAN of the first network (RAN 1) using first credentials (Cred 1) stored in the UE device. It may have one or more connections, i.e. PDU sessions, to a first data network of the first network. The UE device additionally has one or more PDU sessions to a second data network. The connection to the second data network connects the UE device to the N3IWF of the second network for setup of a connection similar to the one set up by UE 2 in FIG. 1 using second credentials (Cred 2). In this architecture, from the second network's point of view, the first network is a non-3GPP access network not under control of the second network. For the first network, the second network is just a service provider for the UE device accessible via the second data network of the first network.

The non-3GPP architecture using 3GPP-defined access networks to provide the non-3GPP access may be reused in various example networks. One example uses multi-USIM devices that have multiple, e.g. two, USIMs to access two different PLMNs but that have transmitter or transceiver capabilities allowing the access to only one RAN at a time. In this case, the first and second credentials (Cred 1 and Cred 2 in FIG. 2) are the credentials stored on the first and the second USIM, respectively. The second example uses one UE device to access synchronously a PLMN and a non-public network (NPN) with the same limited transceiver or transmitter capabilities. In that case, the first credentials (Cred 1) may be stored on a USIM in the UE device for accessing the PLMN and the second credentials (Cred 2) may be non-3GPP credentials, e.g. a certificate, stored in the UE device for accessing the NPN.

In the following, the term PLMN is generally used for 3GPP networks, i.e. cellular mobile communication networks with a core network and potentially one or more RANs. The term includes deployments such as the one described above where a 3GPP network is an NPN, i.e. PLMN in the following can be public or non-public and no distinction is made if not explicitly described.

The related architecture on which this invention is built is described in 3GPP TS 23.501 §§ 5.30.2.7 and 5.30.2.8, see for example version 16.4.0.

The non-3GPP access to a PLMN requires the following functionality be performed to register a UE device in the PLMN, i.e. to access the core network from the UE device via an access network not controlled by the PLMN (N3-AN).

The UE acquires IP-connectivity from the N3-AN, i.e. it usually receives an IP address, later called outer IP address throughout this document, and gets access to the non-3GPP access network which connects the UE device to at least a N3IWF, e.g. via the internet. The UE device then performs a selection of an N3IWF based on a pre-configured selection policy.

The UE accesses the N3IWF via the non-3GPP access network and performs a key exchange with the N3IWF as described in IETF RFC 7296, Internet Key Exchange V2 (IKEv2) and 3GPP TS 23.502, § 4.12.2 which are considered to be included in this description without repeating the procedures.

A security association (SA) in established between the UE device and the N3IWF which is basically an encrypted tunnel between the UE device, represented by its current IP address and potentially port number, and the N3IWF, represented by its current IP address and potentially port number. Means for NAT traversal are included so that UE devices may establish a tunnel through the NAT, if applicable. If the UE device supports means for overcoming IP address changes as described in IETF RFC 4555, IKEv2 Mobility and Multihoming Protocol, MOBIKE, these means are setup as well.

The establishment of a security association (SA) includes multiple message exchanges from the UE device to the N3IWF. These messages provide for an initial establishment of an encrypted tunnel, exchange of credentials, authentication of the UE device in the core network involving an AMF, the AUSF and the UDM, and finally establishing an IPsec security association for further exchange of NAS signalling messages via the IPsec tunnel between the UE device and the N3IWF and further to an AMF through the PLMN's core network.

For the setup of the IPsec tunnel, the N3IWF allocates to the UE a second IP address from a N3IWF-local address space, the inner IP-address. Also, the UE is provided with a destination IP address from the same address space to which the UE addresses control messages to the CN, i.e. to its AMF, the so called NAS_IP_ADDRESS. The N3IWF uses the NAS_IP_ADDRESS as a source and the inner IP-address of the UE as a destination for NAS signalling over the IPSec tunnel.

Once the IPsec tunnel between UE and N3IWF is securely setup, the UE has a route that constitutes its logical connection to the AMF. The UE device is now controlled by the selected AMF and it may request the setup of connections to a data network via user plane functions (UPFs) over the N3-AN. For that purpose, PDU sessions are setup via the selected N3IWF and for each PDU session, a child security association may be established between the UE device and the N3IWF.

This setup procedure is used similarly or identically in case the non-3GPP access network is another PLMN, e.g. an NPN.

As evident from above description and even more so, if the referenced detailed descriptions of 3GPP and IETF communication standards are taken into account, the procedure to register a UE device via a non-3GPP access network and a N3IWF requires a number of message exchanges and thus takes significant time. The setup of a PDU session via N3IWF after registration would take additional NAS signalling message exchanges via the established SA and thus consume even more time.

The subject matter of the current invention is an enhanced handover method. 3GPP TS 23.502 V16.4.0 § 4.9.2.2 describes a handover procedure for an existing PDU session, set up between a UE device connected to a first RAN to a first PLMN. The procedure is for a handover of the PDU session to a connection to a non-3GPP access network via an N3IWF of the first PLMN. The procedure includes the steps registration via untrusted non-3GPP access, PDU session establishment via untrusted non-3GPP access, and release of RAN resources. The procedure thus assumes that registration and PDU session establishment over non-3GPP access can occur while the RAN resources are still in use and data transfer can continue. Only after the PDU session has been established via non-3GPP access and N3IWF, the RAN resources are released.

This procedure is applicable for non-3GPP access network that can be used in parallel to an existing link between the UE device and the first RAN, e.g. for WLAN-based N3-AN. For a non-3GPP access network using a second RAN and a second PLMN for a UE device with transceiver or transmitter capabilities that limit the device to a single RAN at a time, the procedure is not applicable.

There is no suggestion in TS 23.502 to establish a connection to the N3IWF via the access network of the same PLMN. In TS 23.502 a tunnel is established in parallel and independent from a connection over a first access network over a N3-AN.

A straightforward alternative procedure for a non-3GPP network using a second RAN of a second PLMN would include the resources of the first RAN being released first and then a handover to take place. The handover would then comprise a registration of the UE device in a second PLMN via a second RAN and a setup of a connection in the second PLMN to a N3IWF of the first PLMN before the three steps describes above can occur, i.e. the registration of the UE device via N3IWF in the first PLMN, the setup of a PDU session via N3IWF in the first PLMN and resulting handover.

This procedure would introduce a massive break into the data flow of the PDU session to be handed over which would not be acceptable for connections demanding service continuity at least to a certain degree.

The current invention is thus an enhancement of the 3GPP system including one or more 3GPP PLMNs, i.e. 3GPP core networks, and 3GPP UE devices. It describes an enhanced handover procedure of an existing connection from access via a first RAN of a first PLMN to access via a second RAN of a second PLMN and a N3IWF of the first PLMN.

The invention provides a method for a user equipment, UE, device to hand over a connection to a first data network from a first access network of a first mobile communications network to a second access network of a second mobile communications network, the method comprising establishing over the first access network a connection to a non-3GPP interworking function, N3IWF, of the first mobile communications network; establishing a communication tunnel between the UE device and the N3IWF over the connection to the N3IWF; establishing a connection of the UE device to the first data network via the communication tunnel; establishing a connection to the second access network and a connection via the second access network to a third data network which provides access to the N3IWF; and informing the N3IWF of a change of a connection identifier thereby enabling the connection which had been established over the first access network to be continued via the second access network.

The invention is an enhancement of a handover procedure. Before the handover occurs, a UE device is connected to a first PLMN via a first RAN of the first PLMN and has established a first set of PDU sessions, i.e. one or more PDU sessions to one or more data networks of the first PLMN for user data exchange. The UE device has transmitter or transceiver capabilities that allow a connection, i.e. transmission, to only a single RAN at a time.

An event requires the UE device to connect to a second PLMN. The event may be the detection by the UE device of the second PLMN which has higher priority than the first PLMN. The event may be a mobile originated or mobile terminated service in the second PLMN of the UE device the UE is required to take, e.g. a mobile terminated voice call, receiving an SMS in the second PLMN or transmitting data in the second PLMN or the like.

The method of the invention may comprise two main steps. The first step occurs while the UE device is connected to the first PLMN via the first RAN. The UE device establishes a second set of PDU sessions, i.e. one or more additional PDU sessions, to a data network that allows a connection of the UE device to a N3IWF of the first PLMN. During the PDU session setup, the UE device receives a first IP-address from the address space of the data network of the first PLMN. The UE then performs a registration of the access to the N3IWF in the first PLMN including the setup of a security association (SA) between the UE device and the N3IWF and a registration of the new access at the core network of the first PLMN, e.g. at its current AMF. For this registration, the UE device uses the newly received first IP-address. The UE device then requests the handover of the first set of PDU sessions from the first RAN to the newly registered connection to the N3IWF of the first PLMN.

In other words, in the first step the UE device uses the existing RAN connection to the first PLMN to build a tunnel through the first PLMN to the N3IWF of the first PLMN and thus emulates a non-3GPP access using the established RAN resources in parallel to existing first set of PDU sessions. The UE device then requests a handover of the existing first set of PDU sessions to the emulated non-3GPP access. The RAN resources directly used for the first set of PDU sessions may then be released while the RAN resources used to set up and maintain the tunnel to the N3IWF now carry the first set of PDU sessions after the handover.

As a result of the first step, the UE device has moved the first set of PDU sessions to a tunnel through an emulated non-3GPP access via a N3IWF of the first PLMN. The emulated non-3GPP access network is built on the second set of PDU sessions, i.e. it is built on the first RAN and connections through the first PLMN. The first step is a preparation for a handover of the newly established tunnel to the second PLMN via the second RAN in the second step. The first step provides the advantage that a secure association between UE and N3IWF, a registration of the UE device via N3IWF of the first PLMN and a logical handover of PDU sessions from RAN to non-3GPP access has already been performed without breaking the data flow of the first set of PDU sessions.

In a second step, the UE device releases all connections to the first RAN and accesses the second PLMN via the second RAN. It requests the setup of a third set of PDU sessions from the second PLMN to a data network of the second PLMN that provides a connection to the N3IWF of the first PLMN. During the PDU session setup, the UE device receives a second IP-address from the address space of the data network of the second PLMN. The UE device then connects via the third set of PDU sessions to the N3IWF of the first PLMN and performs the steps described in IETF RFC 4555, IKEv2 Mobility and Multihoming Protocol, MOBIKE for change of the UE device's IP-address within an existing security association. The UE device thus changes its IP-address associated in the N3IWF with the IPSec tunnel from the first to the second IP-address, i.e. the UE changes the endpoint of the IPSec tunnel on its side. Essentially, the steps according to MOBIKE are:

sending to the N3IWF an informational request containing an UPDATE_SA_ADDRESSES notification and receiving from the N3IWF an informational response confirming the update of IP-addresses of the UE device.

The IPSec security associations associated with the non-3GPP access tunnel, i.e. with the IKEv2 security association and child security associations, will then continue to tunnel the data of the first set of PDU sessions through the tunnel now transported over the third set of PDU sessions in the second PLMN. The current invention limits the break in time of service provided for these PDU sessions to the time required for registering the UE device in the second PLMN and setting up an appropriate third set of PDU sessions in the second PLMN. This is a significant reduction of service break.

An additional step may be introduced as an intermediate step between the first and the second step to further reduce the time of service discontinuity. Before the UE device releases its resources in the RAN, the first PLMN may send to the second PLMN information preparing the later establishment of a third set of PDU sessions for connecting the UE device with the N3IWF of the first PLMN through the second PLMN. The first PLMN may for example send to the network exposure function (NEF) of the second PLMN a message requesting the setup of a third set of PDU sessions of the UE device to the N3IWF of the first PLMN identified by an IP-address or a fully qualified domain name (FQDN) of the N3IWF. The UE device may have provided identity information to the first PLMN with which the UE device is identified within the message sent to the second PLMN. The message may comprise information about the nature of the PDU sessions requested from the second PLMN for a connection to the N3IWF, e.g. the data rate, latency, QoS etc.

The second PLMN may then use this information to identify the UE device and prepare setup of the requested PDU sessions. If the UE device is already registered, the second PLMN may page the UE device over the second RAN of the second PLMN, if not already done, and set the paging cause to mobile terminated data pending or to a new cause indicating pending connection to another PLMN.

In the very special case that the UE device is connected to the second PLMN via the first PLMN and a N3IWF of the second PLMN, the UE device itself may inform the second PLMN about the required third set of PDU sessions. The UE may request the setup of the third set of PDU sessions over the N3IWF of the second PLMN and after accessing the second PLMN over the second RAN it may request the handover of the third set of PDU sessions from non-3GPP access via the first PLMN to 3GPP access via the second RAN. This may again reduce the time for setup of the PDU sessions and thus reduce the break time for the first set of PDU sessions.

An alternative approach related to the current invention is described in the following focussing on the differences between the above approach and the alternative approach. The alternative approach uses so called multi-access (MA)-PDU sessions as introduced in the 5G system in Release 16.

A MA-PDU session is a PDU session, i.e. a connection between a UE device and a data network via one or more UPFs, via 3GPP access and non-3GPP access simultaneously. Data transferred over MA-PDU sessions may be transmitted over a single access, e.g. 3GPP access, preselected at session setup or at another point in time during the lifetime of the session. A switching decision may change the access, e.g. to non-3GPP access, according to policies received and measurements performed in the UE device (for uplink traffic) and the edge UPF (for downlink traffic). In this case, an easy re-selection of the actually used access is possible without performing a handover procedure from 3GPP access to non-3GPP access or vice versa. Alternatively, data may be transferred over both accesses, with an access selection performed per data packet based on policies and measurements. In another alternative, data packets are transmitted redundantly over both accesses to increase reception likelihood.

The first set of PDU sessions may be set up as MA-PDU sessions with an active and used 3GPP access leg and an inactive and not yet established non-3GPP access leg. In the first step described above, the UE device establishes a second set of PDU sessions and registers an emulated non-3GPP access at the N3IWF of the first PLMN as described. In this alternative approach, the handover of the first set of PDU sessions is replaced by an activation and selection of the non-3GPP access leg of the first set of PDU sessions while the 3GPP access is deselected. For a limited time both accesses may be used in parallel, with a per packet access selection, to overcome potential starting problems with the emulated non-3GPP access. After release of the RAN resources before performing the second step, the 3GPP access of the first set of MA-PDU sessions may be deactivated or deselected. It may be that the UE device during establishment of the first set of MA-PDU sessions receives a policy from the core network comprising rules for using the 3GPP access leg as long as it is available and for activating and using the emulated non-3GPP access leg autonomously when the 3GPP access leg is or is about to become unavailable. An edge UPF in the core network may be configured likewise, e.g. based on network policies, and it may be informed about availability of 3GPP and non-3GPP access legs in order to apply the appropriate routing according to the policy.

The second step for switching the established IPSec tunnel from the emulated non-3GPP access through the first PLMN to the connection through the second PLMN is unchanged in this alternative approach, so that finally data of the first set of PDU sessions is continued to be transmitted over the non-3GPP access leg of the MA-PDU sessions over the second PLMN.

Yet another alternative approach also uses MA-PDU sessions. The UE device when registered in the first PLMN of a first RAN may determine that a potential switch to a second PLMN may occur later while the UE device has active services that need to be switched to the second PLMN with as little disruption as possible. The first PLMN may for example inform the UE device during or after the registration that such a change may occur and that an IPsec tunnel establishment is required or allowed as a preparation for such a switch. Alternatively, the UE device may have such information stored as part of a pre-configuration.

The UE device may first request from the first PLMN to establish a set of PDU sessions (the second set of PDU sessions discussed above) to a data network (DN 2) that provides a connection to the N3IWF of the first PLMN. These sessions will in most cases only comprise a single PDU session. After establishment of the second set of PDU sessions, the N3IWF of the first PLMN is requested to setup an IPSec tunnel and register an emulated non-3GPP access of the UE device at the core network as described previously. As a result, the UE device is registered in parallel over the first RAN and the emulated non-3GPP access transported over the first RAN via the N3IWF.

If the UE device needs to establish PDU sessions to receive services from the first PLMN, it will establish a set of PDU sessions (the first set of PDU sessions discussed above) as MA-PDU sessions with both, a 3GPP access leg over the first RAN and a non-3GPP access leg over the established tunnel. For efficiency reasons, the non-3GPP access leg may be deactivated, so all data packets are transported over 3GPP access as long as this access is available. This may be done by a configuration from the core network to the UE device and to the edge UPFs of the PDU sessions with policies restricting the MA-PDU sessions to the 3GPP access leg as long as it is continually available and triggering a switch to the non-3GPP access leg when the 3GPP access is not available.

This approach has the clear advantage that after a detection of a loss of coverage of the first RAN or the need to switch to another RAN, there is no preparation to be performed in the first PLMN. The resources related to the first RAN can be released and a connection to a second PLMN via a second RAN can be performed right away with registration in the second PLMN, setup of a third set of PDU sessions and informing the N3IWF of the first PLMN about a change of IP-address as described in the previous invention approaches. This approach is the preferred variant of the current idea because the switch between PLMNs can occur any time and finally the established PDU sessions can continue between the UE device and the first PLMN with a minimum disruption time.

Preferred embodiments of the invention will now be described, by way of example only, with reference to the accompanying drawings in which.

Figures 3, 3B:
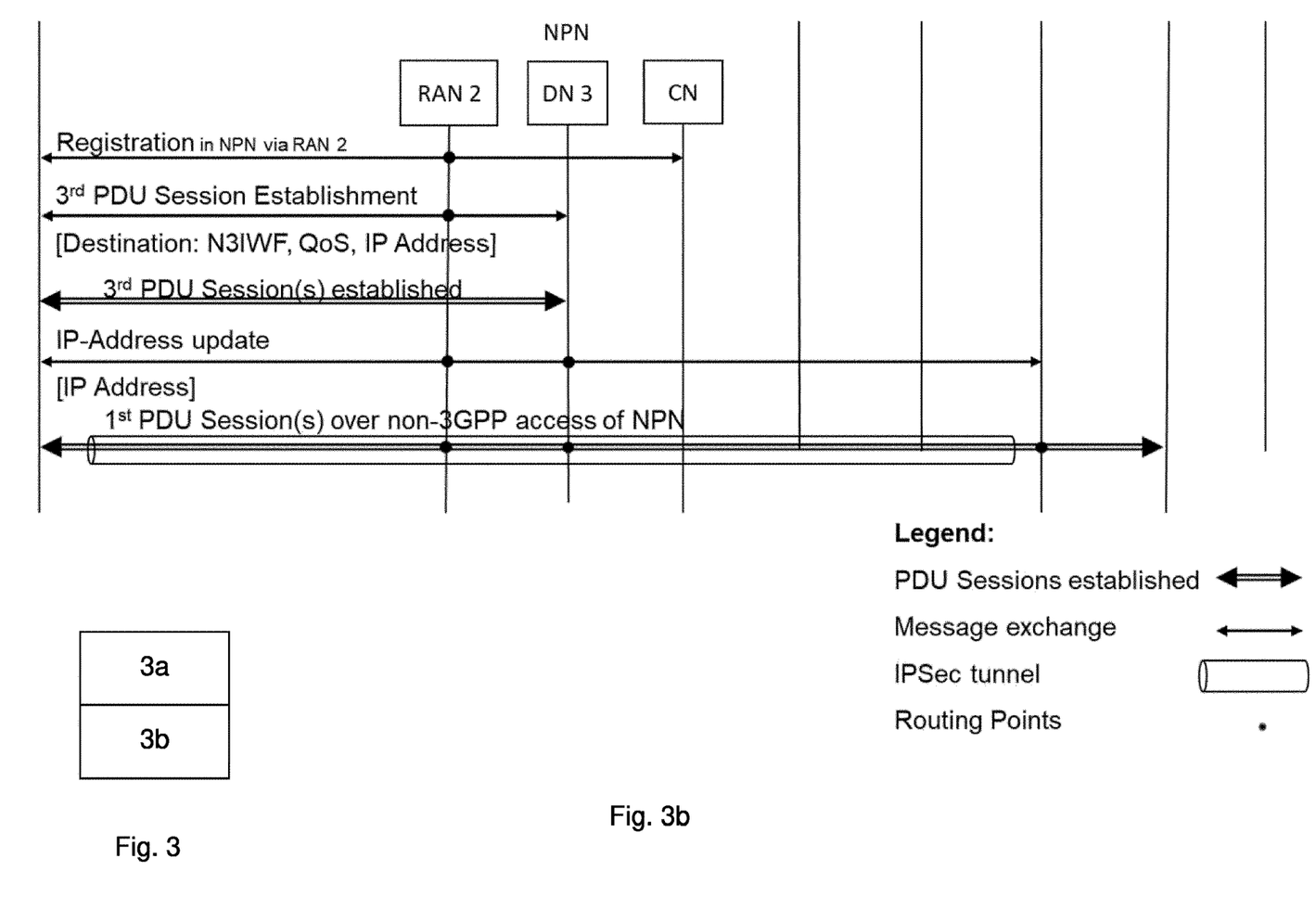
FIG. 3 is a message sequence chart of a first embodiment of the invention.
Figure 3A:
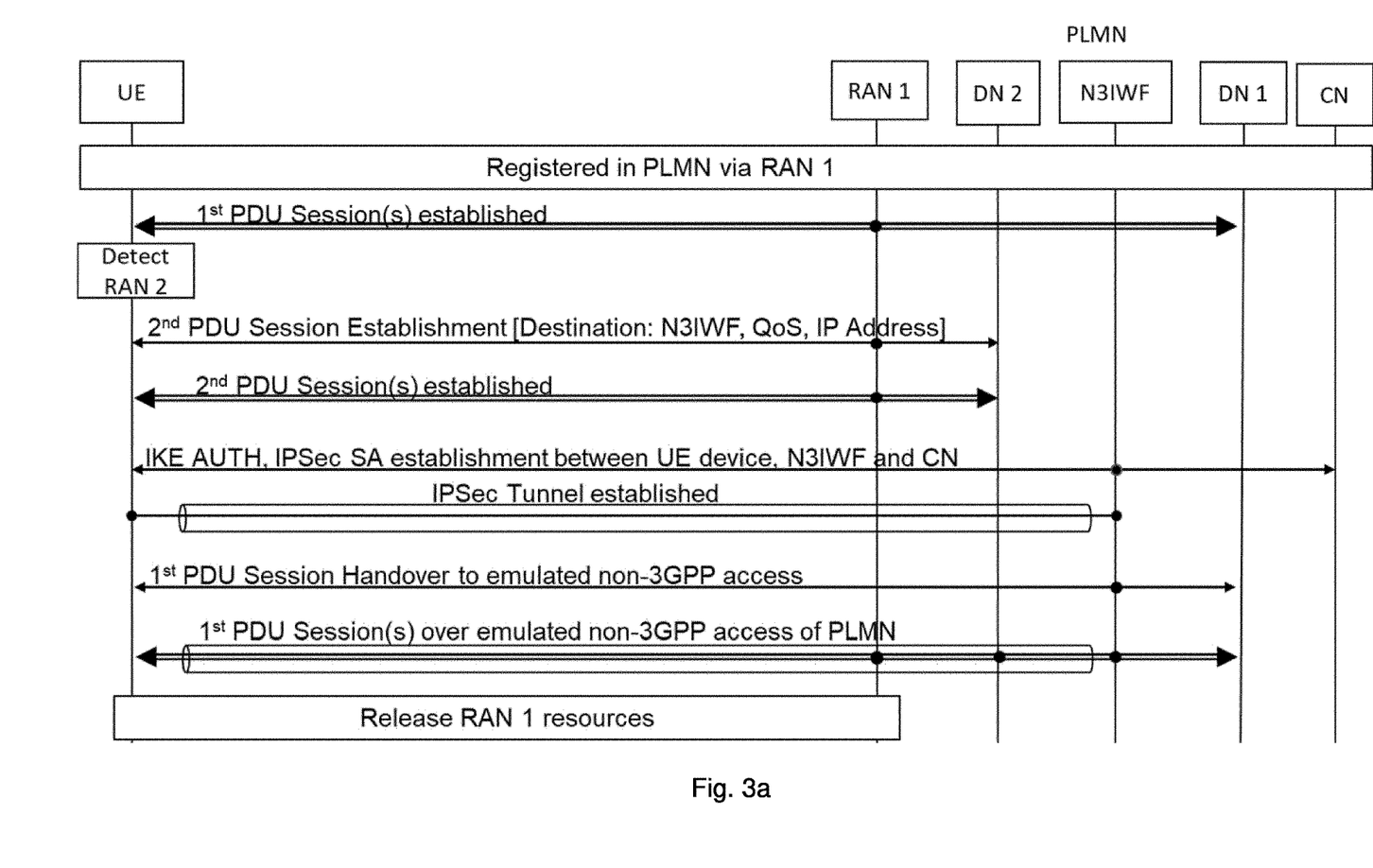

FIG. 3 shows a message sequence and resulting PDU sessions and IPSec tunnels between a UE device, a PLMN and an NPN of a first embodiment. The PLMN comprises example wise a first radio access network (RAN 1), a core network (CN), a non-3GPP interworking function (N3IWF) and two different data networks (DN 1, DN 2). The data networks are essentially ingress/egress points of the core network towards a specific outside network. DN 1 may be example wise an IP-based multimedia subnetwork (IMS) which offers IP-based voice and video call services to the users of the PLMN. The UE device may be registered in the PLMN over its USIM and it may have an ongoing voice and video call over a first set of PDU Sessions depicted with a double lined arrow between the UE device and DN 1. The first set of PDU sessions may comprise three PDU sessions, one for IMS signalling, one for voice data and one for video data. A dot on the double lined arrow indicates the first set of PDU sessions is established via RAN 1.

The UE device is assumed to have only single transmit capabilities, it thus can connect to only one radio access network at a time. The UE device has a single USIM implemented on an inserted UICC for authentication towards the PLMN or towards other PLMNs if the UE device is roaming. Roaming is an option that integrates with this invention without any significant change, therefore the roaming case is not explicitly shown. The UE device has in addition credentials for authentication in an NPN stored in its memory, e.g. in a secure storage built in the device. The credentials may have been received via an app stored and executed on the phone from the NPN. The NPN may, for example, be a network of an industrial plant in which the user of the UE device is working. One or more apps on the UE device may offer special services if the UE device is connected to the NPN via a radio access network of the NPN. The NPN is a full 3GPP network with a radio access network (RAN 2), a core network (CN) offering access to one or more data networks (DN 3). The NPN is shown in the lower part of FIG. 3.

While the UE device is connected to the PLMN via RAN 1 and has an ongoing voice and video call, the UE may be moved into the coverage area of the NPN that overlaps with the coverage area of the PLMN. A background cell search detects RAN 2 of the NPN and because that network has a higher priority than the PLMN, the UE device starts the process of leaving RAN 1 and connecting to the NPN via RAN 2.

The UE device and the PLMN now perform a procedure according to the invention to prevent or reduce a break in the ongoing voice and video call. The UE device requests a second set of PDU sessions from the PLMN via RAN 1 with a destination data network that allows a connection to the N3IWF of the same PLMN and with a QoS matching the QoS required for the first set of PDU sessions. The second set of PDU sessions may for example comprise four PDU sessions with a first session for IPSec tunnel establishment and NAS signalling and three further sessions with a QoS that matches the sessions of the first set of PDU sessions, i.e. IMS signalling, voice and video data, respectively. Alternatively, the UE device requests a second set of PDU sessions that only comprises a single PDU session for IPSec tunnel setup and NAS signalling. The second set of PDU sessions may later grow by further PDU sessions for data transfer. The second set of PDU sessions may alternatively comprise a single PDU session with a QoS that is high enough to transport NAS and IMS signalling, voice and video data at the same time. Once the second set of PDU sessions is established, the UE device receives an IP-address specific for the data network DN 2.

The UE device will now select a N3IWF and request from the N3IWF the setup of an IPSec tunnel as described in more detail in the above referenced IETF and 3GPP specifications. The UE device will set up an IKE security association (SA) first including negotiation of a cryptographic algorithm, register its emulated non-3GPP access with the core network (CN) of the PLMN, exchange and authenticate its identity which finally leads to the establishment of an IPSec tunnel for exchange of NAS signalling messages between the UE device and the CN.

The UE device then requests handover of the first set of PDU sessions from RAN 1 to the newly established IPSec tunnel to the N3IWF. This handover may lead to the creation of child security associations (Child SAs) for each PDU session in the first set. The creation of Child SAs may further lead to establishment of further PDU sessions within the second set of PDU sessions for transport of the IPSec tunnel depending on the selected alternative setup of the second set of PDU sessions as described above. Finally, the first set of PDU sessions will be transported completely over the established IPSec tunnel that is transported over the second set of PDU sessions via RAN 1, DN 2 and the N3IWF of the PLMN as depicted in FIG. 3.

DN 2 may be a specific data network established by the PLMN for the purpose to connect to an N3IWF of the PLMN from inside the PLMN as newly introduced by this invention. DN 2 may alternatively be a general-purpose data network and the connection to the N3IWF may use an external transport network to connect the egress point of DN 2 and the N3IWF. The PLMN may implement specific methods to fasten the IKE SA establishment functions making use of the fact that the emulated non-3GPP access is in fact under full control of the PLMN. The setup of the second set of PDU sessions may for example trigger the core network to provide the N3IWF with authentication information in advance to reduce the delay of the IPSec tunnel establishment and thus accelerate the registration of the UE device in the NPN after detection of RAN 2.

The UE device can now request from the PLMN release of its resources in RAN 1 including the second set of PDU sessions that are established via RAN 1. The UE device will not request the release of the first set of PDU sessions which are carried over the IPSec tunnel to the N3IWF even though the tunnel itself is carried over the second set of PDU sessions and thus loses its underlying transport layer.

After release of radio resources to RAN 1 the UE registers itself in the NPN via RAN 2 and requests the establishment of a third set of PDU sessions to a data network (DN 3) that provides access to the N3IWF of the first PLMN identified again by its IP-address, a FQDN or a URL.

The third set of PDU sessions may be requested as a single PDU session for all data transmitted through the IPSec tunnel or as separate PDU sessions for different parts of the data flow. In this exemplary embodiment we assume a single PDU session is requested from the NPN first for exchange of IKE AUTH messages quickly informing the N3IWF about the change of IP-address and related change of the endpoint that has occurred for the IPsec tunnel. Shortly after that PDU session is set up, the UE device requests further PDU sessions to DN 3 for transport of IMS signalling and voice and video data. The UE device informs the N3IWF about the change of IP-address according to the MOBIKE description referenced above and from that moment, the first set of PDU sessions to the PLMN is carried over the established IPSec tunnel over the third set of PDU sessions of the NPN. The voice and video call will continue after no, or minimal, interruption for the user.

Figures 4, 4B:
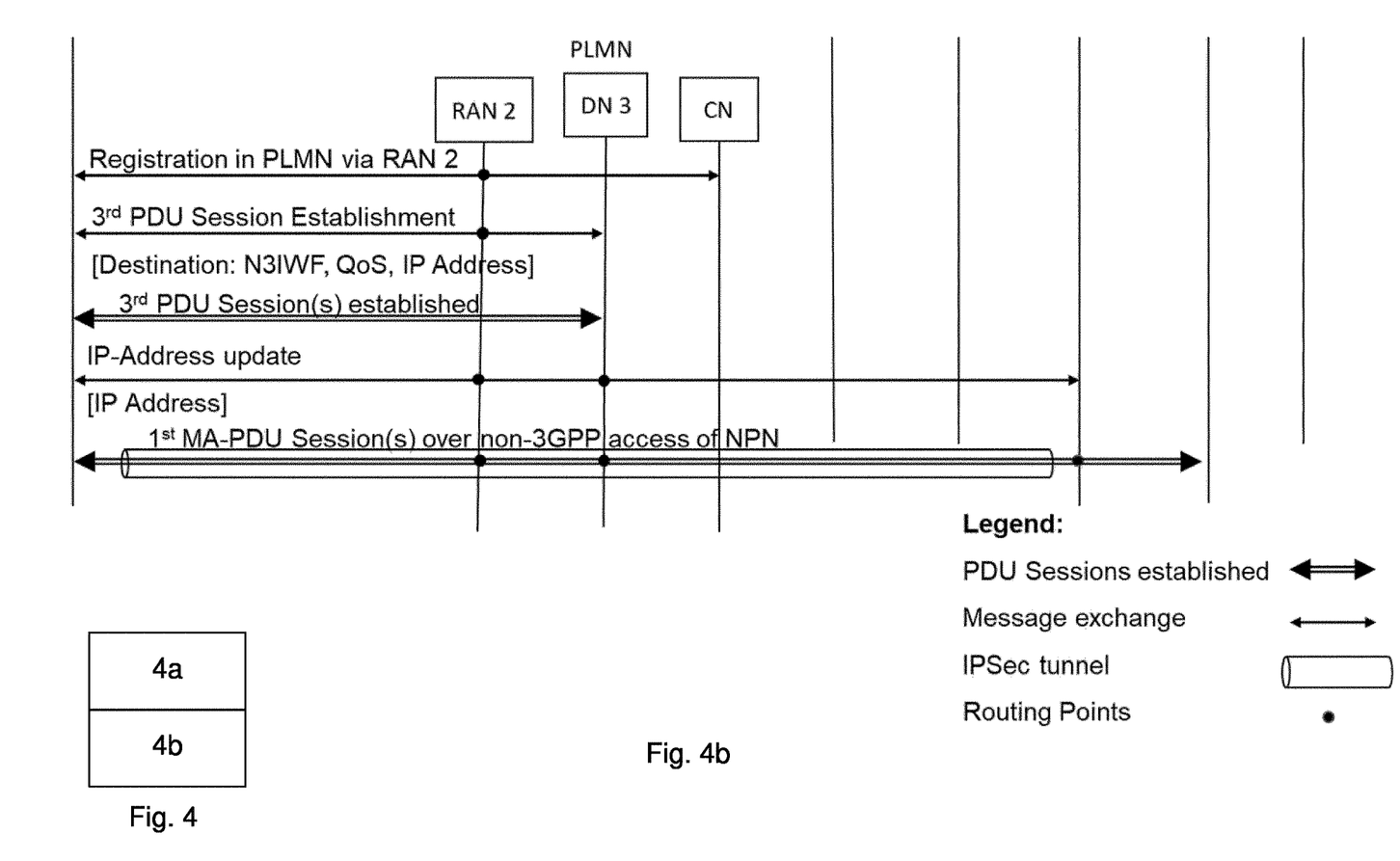
FIG. 4 is a message sequence chart of a second embodiment of the invention.
Figure 4A:
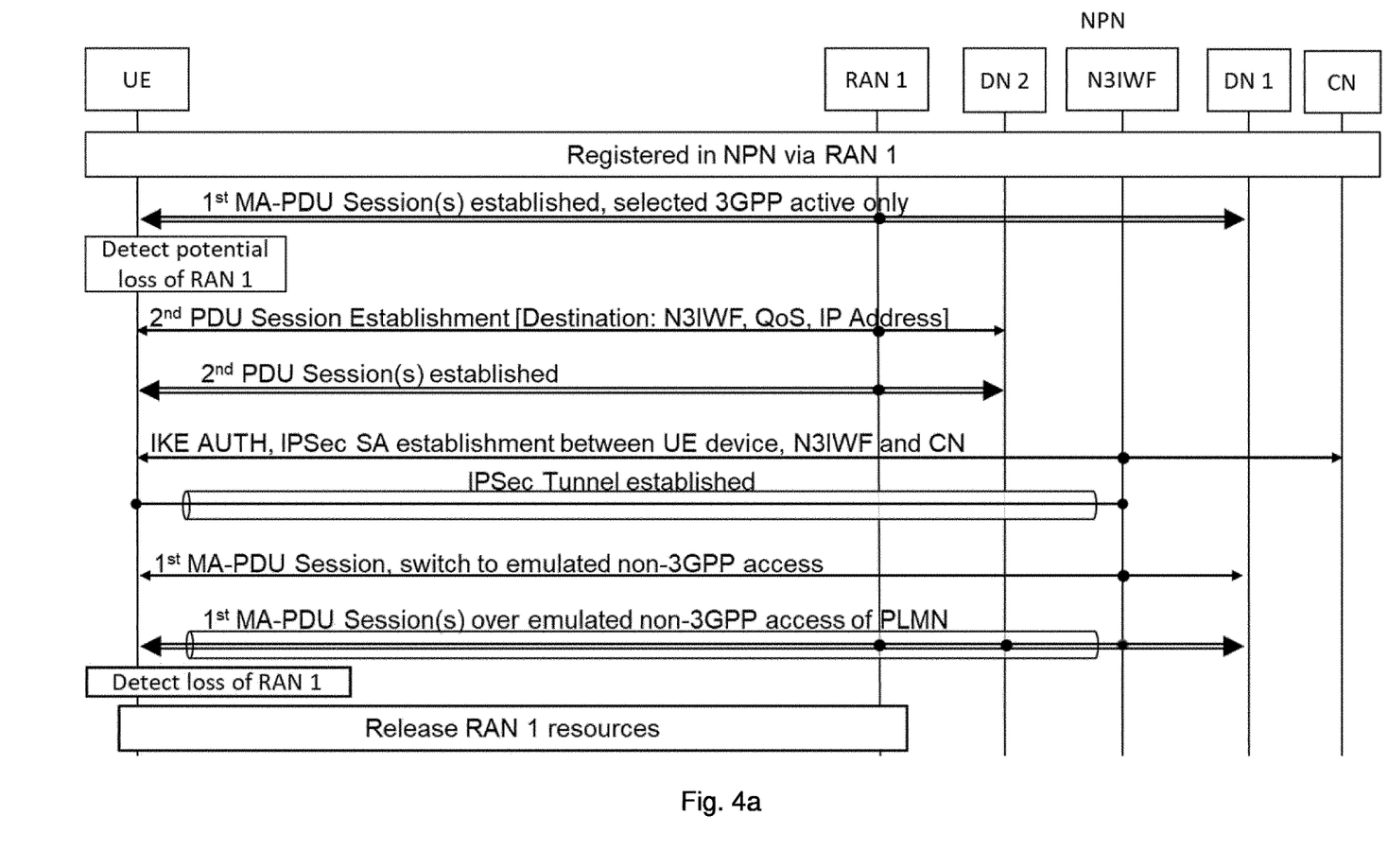

A second embodiment is shown in FIG. 4. This embodiment implements the invention in a similar way as described with reference to the first embodiment with exchanged roles of the PLMN and the NPN. In this example, the UE device may first be registered over RAN 1 to the NPN having an ongoing service running in DN 1. For that service, the UE device has set up a first set of PDU sessions to DN 1 and these PDU sessions are setup as multiple access PDU (MA-PDU) sessions. The reason for using MA-PDU sessions may be because the scenario described below may be anticipated by the NPN because the coverage area of the NPN is small and UE devices moving out of the coverage area but requiring to keep their current services running is a regular use case in this NPN. The MA-PDU sessions are set up with the 3GPP access leg selected and activated and the non-3GPP access leg not activated.

The UE device detects that it will probably soon lose connection to RAN 1 because it is leaving its coverage area. This detection may be based on location information and knowledge of the coverage area of RAN 1 or based on fading radio signals or other means for detection.

The UE device requests, as in the first embodiment, the setup of a second set of PDU sessions that provides connection to a N3IWF of the NPN and establishes an IPSec tunnel to the N3IWF. Now, the UE device or the CN request a switch of access for the first set of MA-PDU sessions to the emulated non-3GPP access. After performance of the switch, the first set of MA-PDU sessions is carried over the IPSec tunnel over RAN 1 and the N3IWF.

In this embodiment, the transport over the IPSec tunnel transported over the NPN itself may be kept for as long as the actual loss of RAN 1 has not been detected. It may be that if it is detected that the UE device does not actually leave the coverage area of RAN 1, the first set of MA-PDU sessions are switched back to a direct connection via RAN 1.

According to the example described for the second embodiment, the actual loss of RAN 1 is detected, and the UE device registers in the PLMN via RAN 2. A third set of PDU sessions is established. An IP-address is received by the UE device which is, after successful setup of the third set of PDU sessions, communicated to the N3IWF of the NPN to switch the IPSec tunnel endpoint to the new connection via RAN 2 and the PLMN. The services received by the UE device via DN 1 is thus not, or only minimally, disrupted.

Figures 5, 5B:
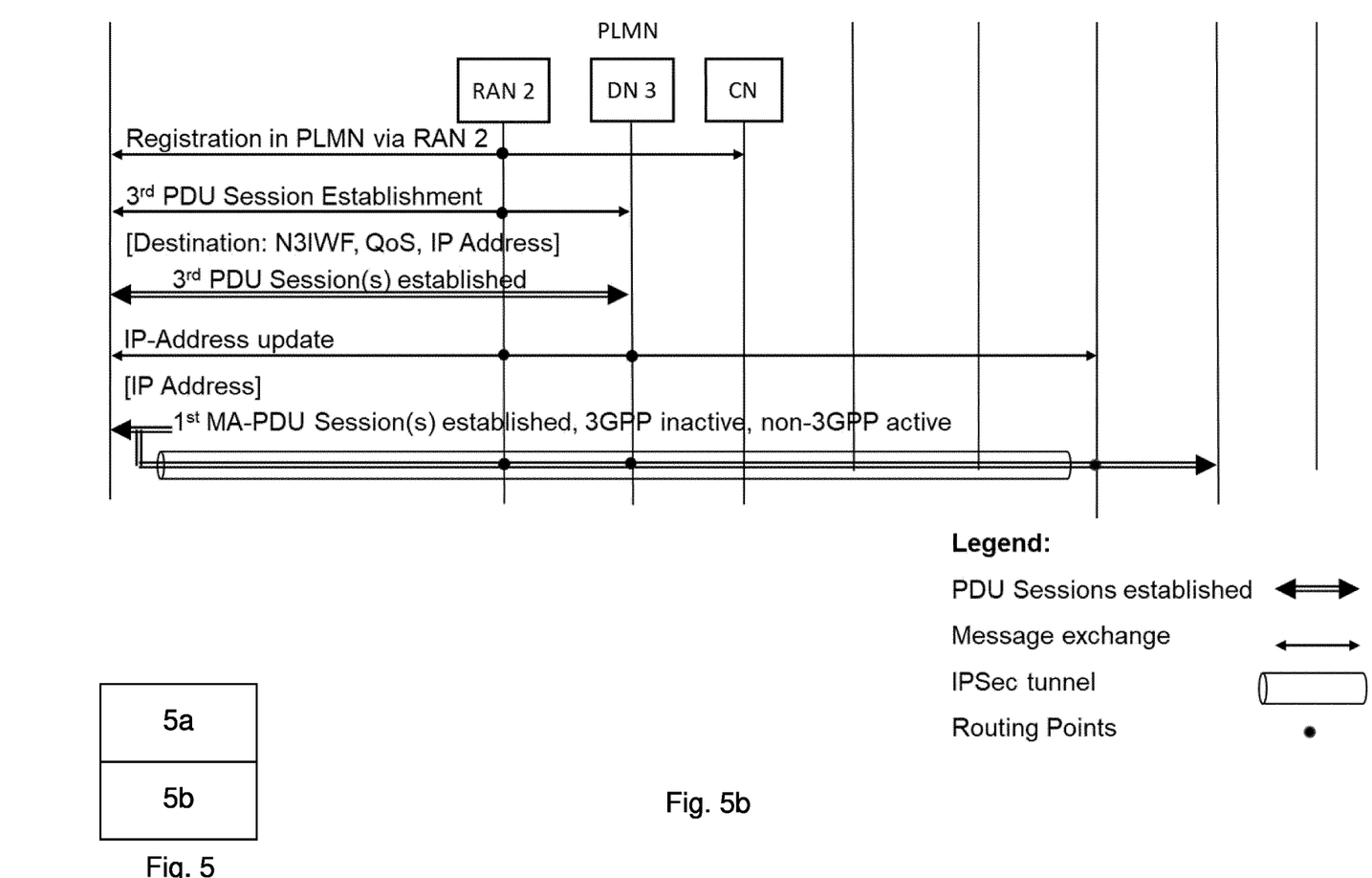
FIG. 5 is a message sequence chart of a third embodiment of the invention.
Figure 5A:
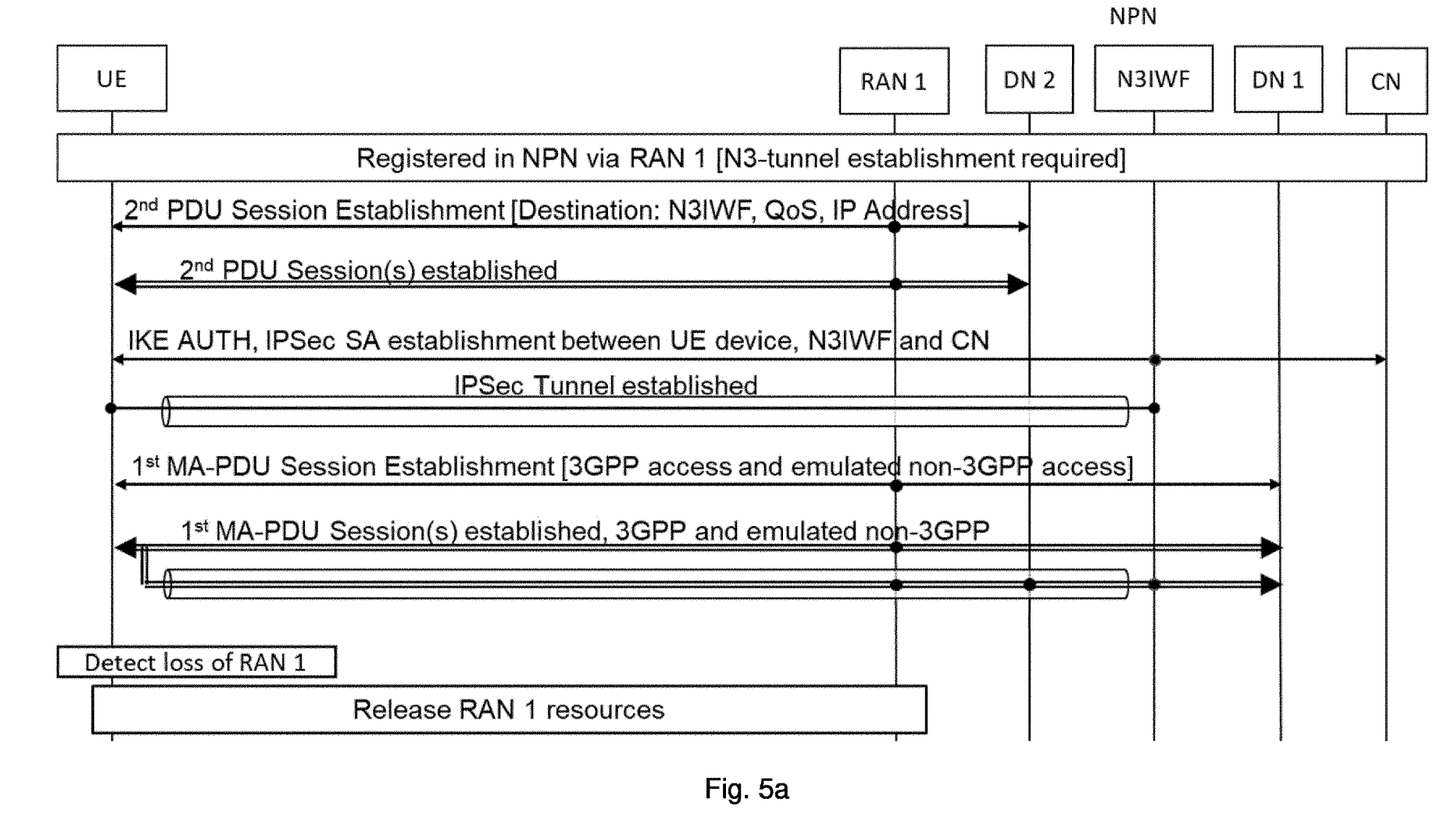

A third embodiment is shown in FIG. 5. A UE device registers in an NPN over a RAN of the NPN (RAN 1). The NPN may inform the UE device during registration that a preparation for a network switch should be triggered by the UE device in that the UE device triggers setup of an emulated non-3GPP access over a N3IWF. The identification of the N3IWF may be provided in that information.

As a result, the UE device requests establishment of a second set of PDU sessions to a data network (DN 2) that provides a connection to the N3IWF identified by the first PLMN during registration. The second set of PDU sessions may at that time only comprise a single PDU session with a requested QoS adapted for IPSec tunnel establishment and NAS signalling. Over the second set of PDU sessions, the UE device requests from the N3IWF the setup of an IPSec tunnel and the registration of the non-3GPP access for the UE device in the core network.

At some point after that, the UE device may need to establish a service in the NPN, e.g. a connection to a machine of the industrial plant for maintenance of the machine. This service may be vital for operation of the industrial plant, so a loss of connection must be prevented. The UE device requests the establishment of a first set of PDU sessions to a data network (DN 1) that provides a connection to the machine. The UE device requests the setup as MA-PDU session with one access leg over RAN 1 and another access leg of the established IPSec tunnel that is transported over RAN 1. For efficiency reasons, the actual transport over the IPSec tunnel may be deactivated as long as the connection via RAN 1 is available. The IPSec tunnel may be enlarged by child security associations for the newly established PDU sessions to enable easy QoS treatment for the data transported over the IPSec tunnel. The UE device may be configured with one or more policies or rules that require the UE to send all packets of the first set of PDU sessions via the 3GPP access leg as long as this leg is available and to switch to the non-3GPP access leg autonomously as soon as the 3GPP access leg is unavailable. An edge UPF may be configured likewise with policies.

It is now assumed that the UE device leaves the coverage area of RAN 1 while an overlapping PLMN offers at the same location a connection to RAN 2. The UE device releases all resources of RAN 1 and registers in the PLMN as in previous embodiments. A third set of PDU sessions is established to a data network that provides connectivity to the N3IWF of the first PLMN and the change of the IP-address is requested from the N3IWF for the IPSec tunnel with the IKE SA and all Child SAs. The connection between the UE device and the machine is now re-established with the changed endpoint on the UE device's side. Having been triggered by the policies and rules received earlier, the UE will now use the IPSec tunnel for all data packets related to the first set of PDU sessions. Likewise, the edge UPF or UPFs of the first set of PDU sessions will apply the received policy which results in routing the respective data packets to the non-3GPP access leg.

In this embodiment, the NPN informed the UE device that a preparation for a network switch should be triggered by the UE device in that the UE device triggers setup of an emulated non-3GPP access over a N3IWF. This information may alternatively be stored in a configuration file on the UE device, the file received at a previous connection to the NPN. The NPN may alternatively provide policies and rules to the UE device that allow the UE device to autonomously determine from an identity of an accessed network, from environmental information, time, location, or radio measurements whether the setup of an IPSec tunnel is required.

The embodiments described herein describe that a first set of PDU sessions, established to receive one or more services from the first network (a PLMN or an NPN in the examples), is switched to a non-3GPP access at first in the first network and later in a second network (NPN or PLMN in the examples). It should be understood that a further set of PDU sessions may be established in the first network that are not switched to a non-3GPP access in accordance with the invention. The UE device or the core network may decide based on policies and rules and based on the nature of the services, e.g. their required QoS and their importance or priority, whether the PDU sessions for each received service require service continuity also in the second network or not. It may for example be decided by the UE device that connections to general-purpose data network, e.g. connection to the internet, are not switched because these services can be received from the second network directly after a change of the network. It may be decided for other services that they do not suffer from interruptions or a break while only services that are important to be continued are switched according to the invention.

It should be clear that while the embodiments are examples of a UE device switching between an NPN and a PLMN or vice versa, this invention is as well applicable for a switch between NPNs or between PLMNs. The second network may even be a non-3GPP network, e.g. a WLAN connection, that was not present or not accessible for the UE device when the services in the first network were established.

The invention claimed is:

1. A method for a user equipment, UE, device to hand over a connection to a first data network from a first access network of a first mobile communications network to a second access network of a second mobile communications network, the method comprising:
   establishing over the first access network a connection to a non-3GPP interworking function, N3IWF, of the first mobile communications network after having established the connection to the first data network using the first access network;
   establishing a communication tunnel between the UE device and the N3IWF over the connection to the N3IWF;
   establishing a connection of the UE device to the first data network via the communication tunnel, the communication tunnel having a tunnel endpoint at the UE device, the tunnel endpoint being identified by a first connection identifier;
   establishing a connection of the UE device to the second access network and a connection of the UE device via the second access network to a third data network which provides access to the N3IWF; and
   informing the N3IWF of a change of a connection identifier from the first connection identifier to a second connection identifier, the second connection identifier identifying the tunnel endpoint at the UE device via the second access network, the change of connection identifier enabling the N3IWF connection which had been established over the first access network to be continued via the second access network.

2. The method according to claim 1, wherein the connection to the N3IWF is established while the connection to the first data network is established using the first access network.

3. The method according to claim 2, wherein after establishment of the communication tunnel, the UE device is connected to the first data network through the communication tunnel over the first access network.

4. The method according to claim 3, wherein:
a connection of the UE device over the first access network to a second data network with a first connection identifier is established in the first mobile communications network, the second data network being able to connect to the N3IWF;
an access to the N3IWF is registered using the first connection identifier;
the connection to the first data network is handed over to a connection via the N3IWF to the first data network; and
following the connection to the second access network, the N3IWF is informed about the change of connection identifier from the first connection identifier to a second connection identifier associated with the connection to the third data network.

5. The method according to claim 2, wherein the connection to the first data network is a multi access packet data unit, MA-PDU, session.

6. The method according to claim 2, wherein:
a connection of the UE device over the first access network to a second data network with a first connection identifier is established in the first mobile communications network, the second data network being able to connect to the N3IWF;
an access to the N3IWF is registered using the first connection identifier;
the connection to the first data network is handed over to a connection via the N3IWF to the first data network; and
following the connection to the second access network, the N3IWF is informed about the change of connection identifier from the first connection identifier to a second connection identifier associated with the connection to the third data network.

7. The method according to claim 1, wherein after establishment of the communication tunnel, the UE device is connected to the first data network through the communication tunnel over the first access network.

8. The method according to claim 7, wherein:
a connection of the UE device over the first access network to a second data network with a first connection identifier is established in the first mobile communications network, the second data network being able to connect to the N3IWF;
an access to the N3IWF is registered using the first connection identifier;
the connection to the first data network is handed over to a connection via the N3IWF to the first data network; and
following the connection to the second access network, the N3IWF is informed about the change of connection identifier from the first connection identifier to a second connection identifier associated with the connection to the third data network.

9. The method according to claim 7, wherein the connection to the first data network is a multi access packet data unit, MA-PDU, session.

10. The method according to claim 1, wherein:
a connection of the UE device over the first access network to a second data network with a first connection identifier is established in the first mobile communications network, the second data network being able to connect to the N3IWF;
an access to the N3IWF is registered using the first connection identifier;
the connection to the first data network is handed over to a connection via the N3IWF to the first data network; and
following the connection to the second access network, the N3IWF is informed about the change of connection identifier from the first connection identifier to a second connection identifier associated with the connection to the third data network.

11. The method according to claim 10, wherein before resources in the first access network are released, the first mobile communications network sends to the second mobile communications network information for preparing the establishment of the connection to the third data network for connecting the UE device with the N3IWF of the first mobile communications network.

12. The method according to claim 11, wherein the first mobile communications network sends a message to a network exposure function of the second mobile communications network requesting a setup of a packet data unit session of the UE device to the N3IWF.

13. The method according to claim 12, wherein the second mobile communications network is provided with identity information of the UE device which the second mobile communications device uses to prepare the setup of the packet data unit session.

14. The method according to claim 10, wherein the UE device is connected to the second mobile communications network via the first mobile communications network and a N3IWF of the second mobile communications network and the UE device requests the second mobile communications network to set up a packet data unit, PDU, session over the N3IWF of the second mobile communications network and after accessing the second radio access network the UE device requests a handover of the PDU session from non-3GPP access via the first mobile communications network to 3GPP access via the second access network.

15. The method according to claim 1, wherein the connection to the first data network is a multi access packet data unit, MA-PDU, session.

16. The method according to claim 1, wherein at or after a registration of the UE device at the first mobile communications network preparation for a change of mobile communications network is triggered by the UE device leading to an establishment of a packet data unit, PDU, session to a second data network which provides a connection to the N3IWF and the UE device requests from the N3IWF a setup of the communication tunnel and a registration of a non-3GPP access for the UE device in a core network of the first mobile communications network.

17. The method according to claim 16, wherein the connection of the UE device to the first data network is set up as a multi access packet data unit, MA-PDU, session having a first communication route from the UE device to the first data network via the first access network and a second communication route from the UE device to the first data network via the communication tunnel, the second data network, and the N3IWF.

18. The method according to claim 17, wherein for establishing a connection of the UE device to the first data network via the communication tunnel a switch of the connection of the UE device to the first data network from the first communication route to the second communication route is performed.

19. A method for a mobile communications network to hand over a connection between a user equipment, UE, device and a first data network from a first access network controlled by the mobile communications network to a second access network controlled by another mobile communications network, the method comprising:

having established the connection between the UE device and the first data network over the first access network, establishing over the first access network a connection to a non-3GPP interworking function, N3IWF, of the mobile communications network;

establishing a communication tunnel between the UE device and the N3IWF over the connection to the N3IWF;

establishing a connection between the UE device and the first data network via the communication tunnel;

receiving in the N3IWF over the second access network information of a change of a connection identifier which identifies a tunnel endpoint of the communication tunnel at the UE device from a first connection identifier identifying the tunnel endpoint at the UE device of the communication tunnel between the UE device and the N3IWF via the first access network to a second connection identifier identifying the tunnel endpoint at the UE device of the communication tunnel between the UE device and the N3IWF via the second access network thereby enabling the connection which had been established over the first access network to be continued via the second access network.

20. The method according to claim 19, further comprising after the establishment of the connection between the UE device and the first data network via the communication tunnel, releasing all connection of the UE device over the first access network while maintaining the communication tunnel between the UE device and the N3IWF and the connection between the UE device and the first data network via the communication tunnel.

\* \* \* \* \*